US012674439B2

(12) United States Patent　　　　(10) Patent No.:　US 12,674,439 B2
Jakobsen et al.　　　　　　　　　　(45) Date of Patent:　　Jul. 7, 2026

(54) COOLING A WIND TURBINE

(71) Applicant: Vestas Wind Systems A/S, Aarhus N (DK)

(72) Inventors: Thomas Riis Jakobsen, Vejle Øst (DK); Michael Staghøj, Ry (DK); Jesper Nyvad, Egå (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/565,112

(22) PCT Filed: May 25, 2022

(86) PCT No.: PCT/DK2022/050111
　§ 371 (c)(1),
　(2) Date: Nov. 29, 2023

(87) PCT Pub. No.: WO2022/253393
　PCT Pub. Date: Dec. 8, 2022

(65)　　　　Prior Publication Data
　US 2024/0369041 A1　　　Nov. 7, 2024

(30)　　Foreign Application Priority Data
　May 31, 2021　(DK) ............................ PA 2021 00575

(51) Int. Cl.
　*F03D 80/60*　　　(2016.01)
　*F03D 80/80*　　　(2016.01)
(52) U.S. Cl.
　CPC .......... *F03D 80/60* (2016.05); *F05B 2260/20* (2013.01)
(58) Field of Classification Search
　CPC ...... F03D 80/60; F03D 80/88; F05B 2260/20; Y02E 10/72
　See application file for complete search history.

(56)　　　　　References Cited

U.S. PATENT DOCUMENTS

| 6,539,899 B1 | 4/2003 | Piccirilli et al. |
| 2008/0290662 A1 | 11/2008 | Matesanz Gil et al. |
| 2016/0128231 A1* | 5/2016 | Wagoner ............ H05K 7/20927 |
| | | 165/104.31 |

FOREIGN PATENT DOCUMENTS

| CN | 204179833 U | 2/2015 |
| CN | 108678911 A | 10/2018 |

(Continued)

OTHER PUBLICATIONS

Machine Translation of CN 109578228A [retrieved on May 28, 2025]. Retrieved from: Espacenet. (Year: 2025).*

(Continued)

*Primary Examiner* — Eric J Zamora Alvarez
(74) *Attorney, Agent, or Firm* — Wood Herron & Evans LLP

(57)　　　　　　ABSTRACT

A cooling system (12) for a wind turbine (2), the cooling system (12) comprising: a fluid circuit (16) arranged to convey a working fluid to and from at least one component (14) of the wind turbine (2), to exchange heat between the working fluid and the component (14); a main pump (26) configured to circulate the working fluid around the fluid circuit (16); and at least one branch line (28) connected to the fluid circuit (16). The, or each, branch line (28) comprises: an inlet (30) arranged to receive working fluid from the fluid circuit (16); an outlet (32) arranged to return working fluid to the fluid circuit (16); a branch pump (36) arranged to pump working fluid through the branch line (28) from the inlet (30) to the outlet (32); and a cooling device (34) arranged to cool working fluid flowing through the branch line (28).

20 Claims, 8 Drawing Sheets

(56)     References Cited

FOREIGN PATENT DOCUMENTS

| CN | 109578228 | A  | 4/2019  |
|----|-----------|----|---------|
| CN | 210660455 | U  | 6/2020  |
| EP | 2743502   | A1 | 6/2014  |
| EP | 2803855   | A1 | 11/2014 |
| EP | 3591222   | A1 | 1/2020  |
| KR | 101503322 | B1 | 3/2015  |
| WO | 2012028145| A1 | 3/2012  |
| WO | 2013021670| A1 | 2/2013  |

OTHER PUBLICATIONS

Danish Patent and Trademark Office, technical examination issued in corresponding DK Application No. OA 2021 00575, dated Dec. 8, 2021.
International Searching Authority, International Search Report and Written Opinion issued in corresponding PCT Application No. PCT/DK2022/050111, dated Aug. 29, 2022.
European Patent Office, examination report issued in corresponding EP Application No. 22729033.5, dated Feb. 5, 2025.
European Patent Office, examination report issued in corresponding EP Application No. 22729033.5, Jan. 22, 2026.
China National Intellectual Property Administration, Office Action, Application No. 202280037702.X, Issued Mar. 20, 2026.

* cited by examiner

COOLING A WIND TURBINE

TECHNICAL FIELD

The present disclosure generally relates to apparatus and methods for controlling the temperature of components of a wind turbine generator.

BACKGROUND

The components housed in the tower and/or the nacelle of a wind turbine generator, such as the electrical generator and power converter, operate most effectively within respective optimal temperature bands. Accordingly, selective cooling and/or heating systems are required to regulate the temperatures of these components.

Fluid recirculation cooling systems for wind turbines are known in which waste heat is transferred to a pressurized working fluid, which then dissipates the heat to the surroundings via a cooling device, such as a heat sink. A pump pressurizes and circulates the working fluid around a fluid circuit comprising an arrangement of pipes and valves, the circuit enabling heat transfer between the components and the cooling device. The high system pressure required to drive fluid around the circuit entails the use of robust components which can tolerate such high pressures, which can become increasingly expensive and difficult to engineer for larger and more complex wind turbines.

To enable cooling to be applied selectively such that the system can operate in a warming mode, for example in cold start conditions, known systems rely on three-way valves to control whether the working fluid flows through or bypasses the cooling device. Such valves are complex and costly to manufacture and maintain.

It is against this background that the invention has been devised.

SUMMARY OF THE INVENTION

According to one aspect of the invention, a cooling system for a wind turbine is provided. The cooling system comprises a fluid circuit arranged to convey a working fluid to and from at least one component of the wind turbine in order to exchange heat between the working fluid and the component. A main pump of the cooling system is configured to circulate the working fluid around the fluid circuit and at least one branch line is connected to the fluid circuit. Each branch line comprises an inlet arranged to receive working fluid from the fluid circuit, an outlet arranged to return working fluid to the fluid circuit, and a branch pump arranged to pump working fluid through the branch line from the inlet to the outlet. The branch line also comprises a cooling device arranged to cool working fluid flowing through the branch line.

The branch line pump shares some of the pumping load of the cooling system, and thus reduces the demands placed on the main pump and the peak pressure in the system. Meanwhile, the branch line and its branch pump provide for selective cooling of the or each component, to the extent that the branch pump can be deactivated to cease flow through the branch line when cooling is not required. In this way, the branch line pump provides the same functionality as three-way valves of known systems, but without the associated increase in system pressure and the corresponding increased pumping capacity required from the main pump.

In some embodiments, the branch pump is operable to produce a variable output. For example, the branch pump may comprise any of: a variable-frequency drive; a variable-voltage drive; and a variable-speed drive. Each branch line may comprise multiple branch line pumps. Variable operation of the branch pump allows for correspondingly varied levels of cooling for the or each component, since the rate of cooling is determined by the relative proportion of working fluid that is drawn into the branch line.

The branch line may comprise a valve configured to prevent fluid flow through the branch line when the branch pump is inactive, thereby preventing idle flow when the system is in a warming mode. The valve may be configured as a normally-closed valve, for example.

The cooling system may comprise a flow director. The flow director comprises a main inlet configured to receive working fluid from the fluid circuit, a main outlet configured to discharge working fluid into the fluid circuit, and a port connected to the outlet of the branch line. The flow director is optionally configured to direct working fluid discharged from the outlet of the branch line away from the inlet of the branch line. Accordingly, the flow director prevents recirculation of cooled working fluid into the branch line and generally controls fluid flow at the junctions between the branch line and the fluid circuit.

The flow director may comprise a further port that is connected to the inlet of the branch line. The port and the further port of the flow director may be at positions in the flow director that are at substantially equal pressure when the branch pump is inactive. This provides a passive means for preventing fluid flow into the branch line when the branch pump is idle. The port and the further port may be substantially coaxial, and may be substantially equidistant from the main inlet, for example.

The flow director may comprise at least one axis of symmetry, which may aid fluid flow control and minimise pressure losses in the flow director. For example, the main inlet and the main outlet may share a common axis, and this axis may define an axis of symmetry for the flow director.

The flow director may comprise a barrier that is configured to obstruct working fluid flowing from the outlet of the branch line to the inlet of the branch line. The barrier may extend between the inlet and the outlet of the branch line, and may be substantially parallel to a direction of flow of working fluid through the fluid circuit and/or substantially orthogonal to a direction of flow of working fluid discharged through the outlet of the branch line.

The invention also extends to a wind turbine comprising the cooling system of the above aspect. The cooling system may be used to cool components housed in a nacelle and/or a tower of the wind turbine, for example.

Another aspect of the invention provides a method of cooling one or more components of a wind turbine. The method comprises: operating a main pump to convey a working fluid around a fluid circuit to and from the or each component of the wind turbine, to exchange heat between the working fluid and the or each component; and operating a branch pump to draw at least some of the working fluid into a branch line that is connected to the fluid circuit and that comprises a cooling device arranged to cool working fluid flowing through the branch line.

It will be appreciated that preferred and/or optional features of each aspect of the invention may be incorporated alone or in appropriate combination in the other aspects of the invention also.

BRIEF DESCRIPTION OF THE DRAWINGS

So that it May be More Fully Understood, the Invention Will Now be Described, by Way of Example Only, with Reference to the Following Drawings, in which Like Features are Assigned Like Reference Numerals, and in which.

DETAILED DESCRIPTION

In general terms, embodiments of the invention provide systems and corresponding methods for selectively cooling components housed within the nacelle and/or tower of a wind turbine generator, although in principle embodiments of the invention could be used to cool any components requiring thermal control.

The approach involves arranging components requiring thermal control in series on a main fluid circuit around which working fluid is circulated by a main pump. Associated with each component is a respective branch line arranged in parallel to the main circuit and comprising a branch line pump which, when activated, draws fluid heated by each component away from the main fluid circuit and to a cooling device located on the branch line, before returning the cooled fluid back to the main fluid circuit. The proportion of the working fluid that is diverted into the branch line from the main fluid circuit, and in turn the extent to which the fluid output from each component is cooled, is controlled independently for each branch line by selectively activating the respective branch line pump to draw working fluid through the associated cooling device.

The branch line pumps are typically configured to provide a variable output, such that the relative split of the working fluid between the main fluid circuit and each of the branch lines can be varied continuously according to instantaneous requirements. For example, the branch line pump may be operable to produce any output between 0% and 100% of its operating range, to create a corresponding continuously variable split of the flow between the main fluid circuit and the corresponding branch line.

This arrangement spreads the pumping requirement between multiple pumps and thereby reduces the burden placed on the main pump to circulate the working fluid. In contrast, in conventional systems in which a single pump acts to convey fluid around the entire circuit, including any cooling devices, that pump must overcome the combined pressure losses of the entire system to maintain a fluid flow, entailing a significantly 20 higher peak system pressure. Accordingly, embodiments of the invention allow for the flow of working fluid to be controlled while maintaining a pressure within the system that is lower and with reduced variation compared with known systems. The operational requirements and the power consumption of the main pump can therefore be reduced. Similarly, as the system pressure is lower the demands placed on other elements arranged within the system are reduced, allowing for those elements to be of a lower specification and, in turn, reduced cost.

Figure 1:
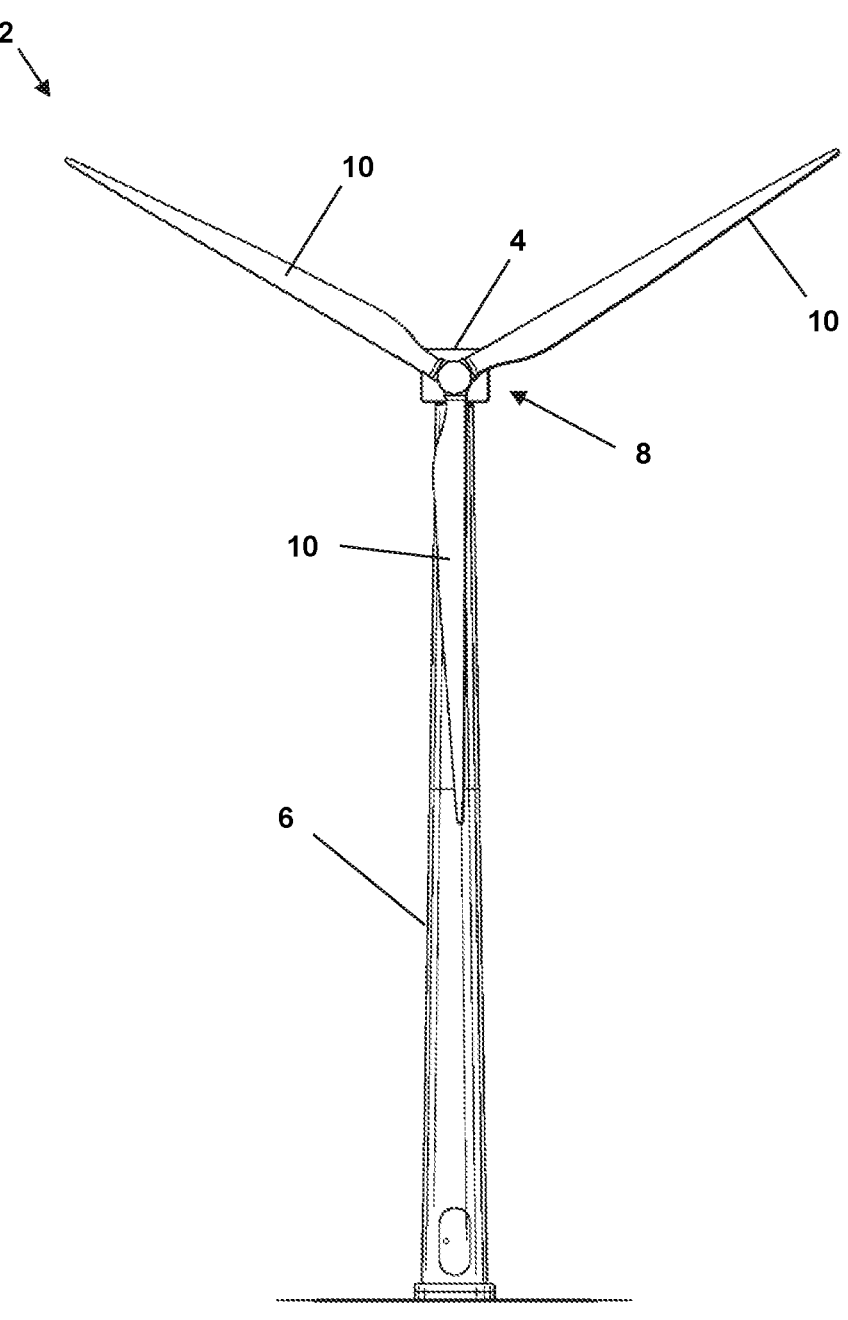
FIG. 1 is a front view of a horizontal axis wind turbine generator to which embodiments of the invention may be applied.

To provide context for the invention, FIG. 1 shows a typical horizontal axis wind turbine 2 that includes a nacelle 4, mounted atop a tower 6, which supports a front facing rotor 8 comprising a plurality of coplanar blades 10. The rotor 8 is connected to a powertrain or drivetrain housed within the nacelle 4. The drivetrain comprises components required to convert rotation of the rotor 8 into electricity, including a generator, a gear system, transformer(s), converter(s), bearing(s) and brake(s).

Figure 2:
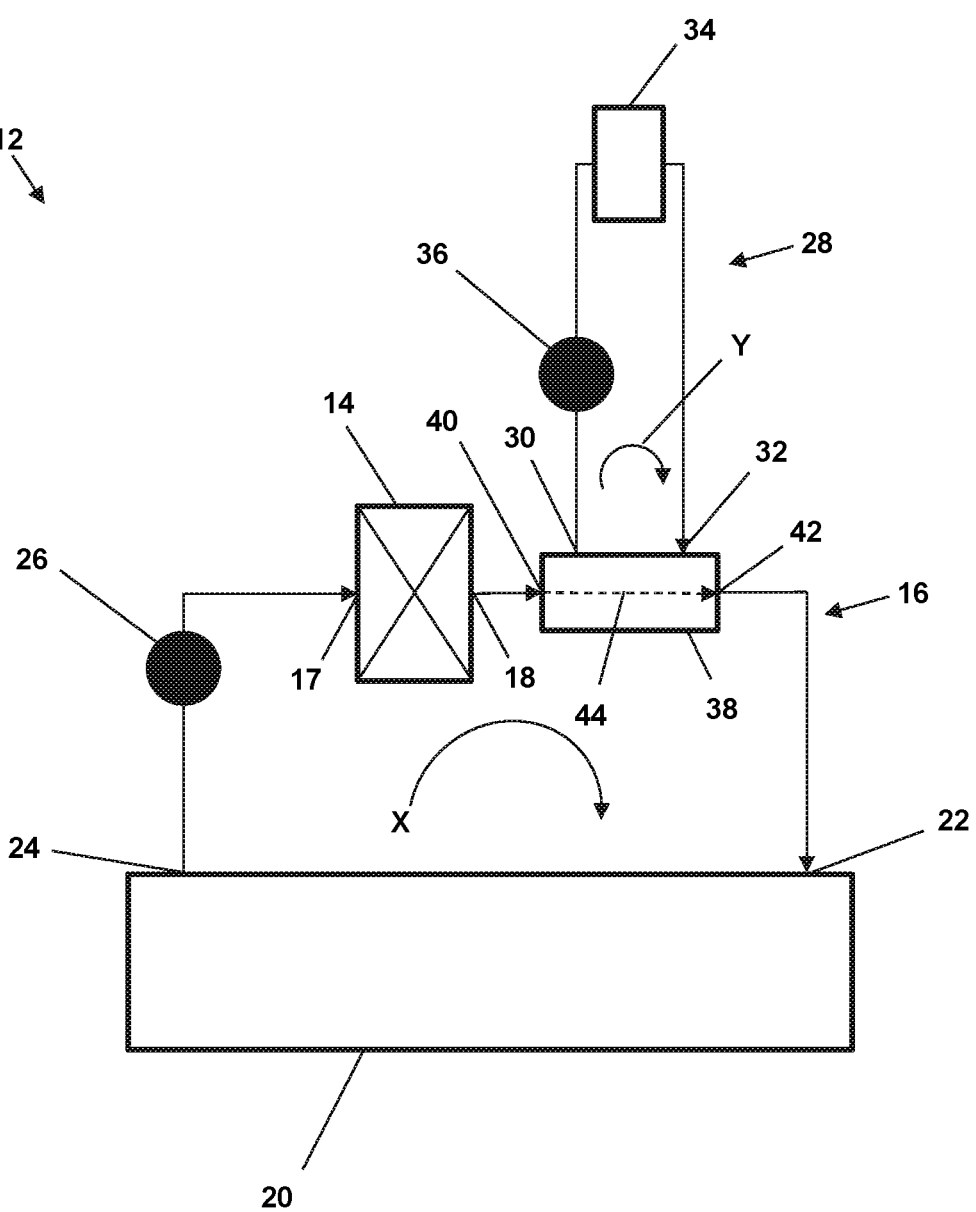
FIG. 2 is a simplified schematic view of a cooling system according to an embodiment of the invention for the wind turbine generator of FIG. 1.
Figure 6:
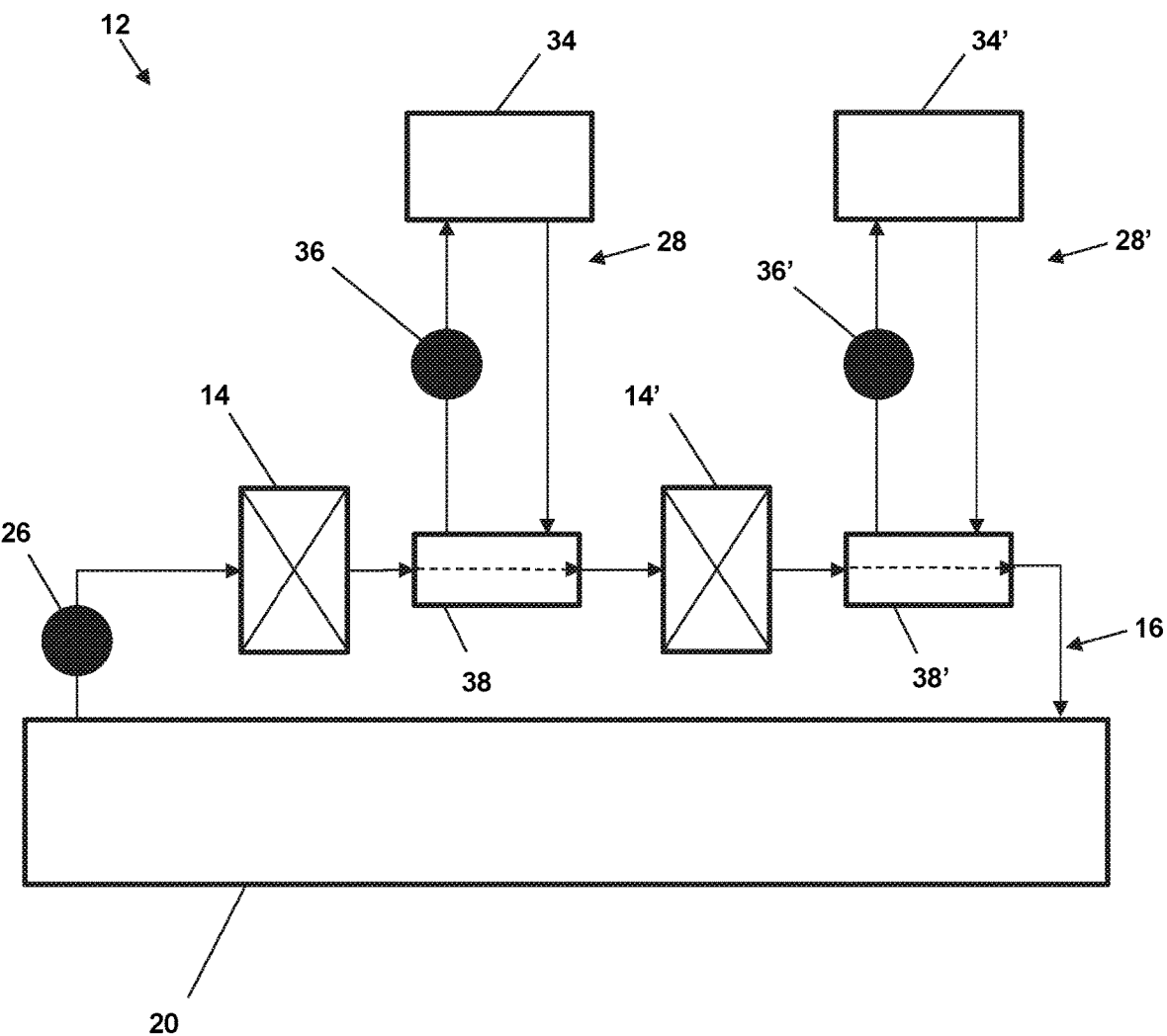
FIG. 6 is a simplified schematic view of a cooling system according to an embodiment of the invention.

FIG. 2 shows a schematic diagram of a cooling system 12 arranged within the nacelle 4 and configured to cool one of the drivetrain components 14 (e.g. the generator). It will be appreciated that FIG. 2 is a simplified view and that, in practice, the cooling system 12 would typically be arranged to cool multiple components 14. FIG. 6 shows an example of how the system 12 may be configured in this respect, but FIG. 2 shows a single component 14 to illustrate the general principle. It will also be appreciated that in other embodiments the cooling system may be configured to cool components housed in the tower 6. It is further noted that the cooling system may include provisions for active heating of components, although these are omitted from the following description for simplicity.

The system 12 comprises a fluid circuit 16 configured to convey a working fluid to and from the generator 14. The working fluid may be a known coolant, for example. For the purposes of this description, the generator will be considered to have an inlet 17 for receiving working fluid and an outlet 18 for discharging working fluid, although in practice the working fluid may not flow through the generator 14 itself. For example, the fluid circuit 16 may direct working fluid through a heat exchanger coupled to, or integrated with, the generator 14.

The fluid circuit 16 includes a tank 20, suitable for holding the working fluid, which has an inlet 22 and an outlet 24. The outlet 24 of the tank 20 is fluidly connected to the inlet 17 of the generator 14 and, similarly, the outlet 18 of the generator 14 is fluidly connected to the inlet 22 of the tank 20. In this way, the fluid circuit 16 is a closed loop around which the working fluid can circulate. The fluid connections within the fluid circuit 16 are made via conduits and ports suitable for allowing the working fluid to flow with minimal pressure losses.

A main pump 26 is arranged in connection with the fluid circuit 16 and is configured to circulate the working fluid around the fluid circuit 16 in the direction shown by arrow X. In this example, the main pump 26 is arranged between the tank outlet 24 and the generator inlet 17, although in principle the main pump 26 can be positioned in any location on the fluid circuit 16.

A branch line 28 is connected to the fluid circuit 16 between the generator outlet 18 and the inlet 22 of the fluid tank 16. The branch line 28 comprises an inlet 30 arranged to receive working fluid from the fluid circuit 16, an outlet 32 arranged to return working fluid to the fluid circuit 16, and a cooling device 34 arranged between the branch line inlet 30 and the branch line outlet 32. The cooling device 34 is any device suitable for cooling the working fluid, such as a radiator.

A branch line pump 36 is arranged in connection with the branch line 28 and is configured to pump working fluid around the branch line 28 from the branch line inlet 30, through the cooling device 34, and back to the fluid circuit 16 at the branch line outlet 32, as shown by arrow Y. In this embodiment, the branch line pump 36 is a variable pump and so is operable to produce a variable output, and thereby operable to draw fluid from the fluid circuit 16 into the branch line 28 at variable flow rates. Such a variable pump may comprise any of a variable-frequency drive, a variable-voltage drive, and a variable-speed drive, for example.

The branch line 28 connects to the fluid circuit 16 through a 'flow director', also referred to as a 'flow diverter' 38. Accordingly, the flow diverter 38 comprises four ports defining, respectively, the branch line inlet 30; the branch line outlet 32; a fluid circuit inlet 40 through which working fluid is received from the fluid circuit 16; and a fluid circuit outlet 42 through which working fluid is discharged into the fluid circuit 16. The flow diverter 38 is configured to minimise pressure losses at and between these ports.

Generally, the flow diverter 38 acts to divert working fluid discharged from the branch line outlet 32 away from the branch line inlet 30 and towards the fluid circuit outlet 42. This ensures that cooled working fluid returning from the cooling device 34 is not recirculated back to the cooling device 34, and more generally helps to control the flow to prevent turbulence and other adverse effects at the junctions between the branch line 28 and the fluid circuit 16.

The flow diverter 38 may also be configured to provide a level of guidance for working fluid entering the fluid circuit inlet 40, specifically to direct some of that fluid into the branch line inlet 30 and thereby assist the branch line pump 36 in changing the direction of flow of a portion of the working fluid and thereby splitting the flow.

The flow divertor 38 also comprises a flow passage that allows undiverted working fluid to flow from the fluid circuit inlet 40 directly to the fluid circuit outlet 42, and therefore flow past the branch line inlet 30 and the branch line outlet 32 to bypass the branch line 28 altogether. For simplicity, this flow passage may be referred to as the bypass line 44, which may be considered to form part of the fluid circuit 16.

The branch line pump 36 and the flow diverter 38 cooperate to control the flow of fluid through the cooling device 34 arranged in the branch line 28. In this way, the temperature of the generator 14 can be regulated, as described below.

When the main pump 26 is activated, working fluid is circulated around the fluid circuit 16 and through or via the generator 14. Here, excess heat produced by the generator 14 is transferred to the working fluid at a rate dictated by a temperature differential between the generator 14 and the working fluid. When the cooling system 12 is in a 'cooling mode', the branch line pump 36 is activated to draw the heated working fluid discharged from the generator outlet 18, through the fluid circuit inlet 40 of the flow diverter 38 and into the branch line 28 via the branch line inlet 30. At the cooling device 34, excess heat is transferred from the working fluid to a heat sink or the surroundings. The cooled working fluid then returns to the fluid circuit 16 via the branch line outlet 32 and the flow diverter 38, from where it is pumped back to the generator 14 via the fluid tank 20 by the main pump 26.

In the cooling mode, the proportion of working fluid that flows along the bypass line 44 determines the final temperature of the working fluid that is returned to the fluid tank 20, as explained in more detail below. As before, the cooled fluid removes the excess heat from the generator 14 and the cycle continues.

When the main pump 26 is activated, but the branch line pump 36 is off, the working fluid is simply circulated around the fluid circuit 16 via the bypass line 44 and without being diverted into the branch line 28. This defines a 'warming mode', in which the working fluid does not encounter the cooling device 34 and so cannot transfer heat away from the system 12. Therefore, the system 12 will warm as the generator 14 operates and continues to produce heat. The warming mode can be used when the temperature of the generator 14 is below its optimal range, to allow the generator 14 to warm. This situation may arise when the operating environment is cold, for example.

As noted above, in this embodiment the branch line pump 36 is configured to provide a variable output, which in turn enables the effective cooling power delivered to the generator 14 to be varied when the system 12 is in the cooling mode. Specifically, the branch line pump 36 can be activated to draw only some of the working fluid through the branch line 28, while the remaining working fluid continues through the bypass line 44.

In this situation, the diverted fluid is cooled at the cooling device 34 arranged in the branch line 28, while the undiverted fluid that flows through the bypass line 44 is not cooled. The two separated fluid flows are then recombined at the branch line outlet 32. In this way, the temperature of the working fluid that is delivered to the generator 14, and in turn the rate of cooling achieved at the generator 14, can be regulated according to the needs of the system 12 by controlling the variable pump output. This enhances the refinement of the cooling system 12, for example by enabling the system 12 to balance the heat transferred into the working fluid from the generator 14 with the heat ejected at the cooling device 34.

Figure 3:
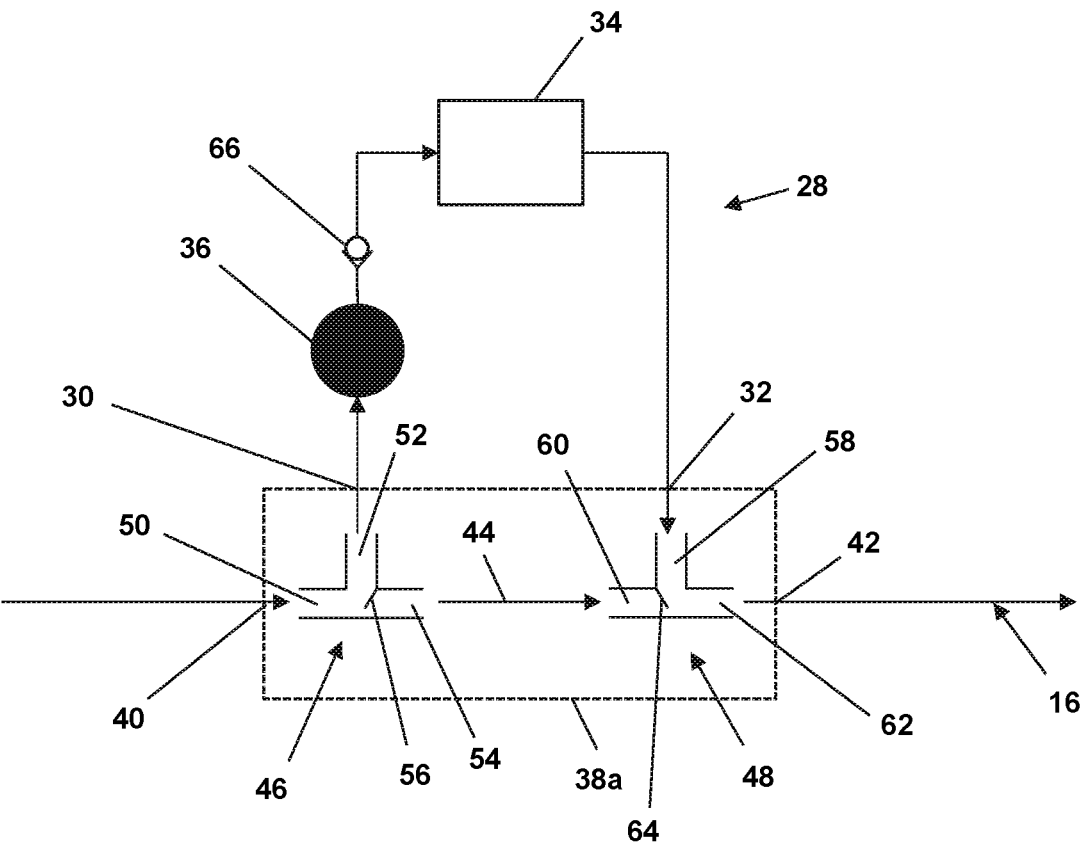
FIG. 3 is a simplified schematic view of a branch line according to an embodiment of the invention for the cooling system of FIG. 2.

FIG. 3 shows one embodiment of the flow diverter 38a, in which the branch line inlet 30 and outlet 32 are connected to the fluid circuit 16 via respective dividing junctions, specifically first and second T-junctions 46 and 48 in this example. FIG. 3 therefore demonstrates that the flow director 38a may be represented by a group of components within the system, and is therefore not necessarily a discrete component itself, for example in the form of a self-contained unit.

The first T-junction 46, which is associated with the branch line inlet 30, is defined by three ports or passages: an inflow passage 50 from the generator defining the fluid circuit inlet 40 of the flow diverter 38; a first outflow passage 52 to the branch line 28 defining the branch line inlet 30; and a second outflow passage 54 leading to the bypass line 44. The first T-junction 46 also includes a diverting barrier 56 at the intersection of the two outflow passages 52 and 54, which extends partway across the second outflow passage 54 to the bypass line 44. In this way, the diverting barrier 56 helps to guide working fluid flowing into the first outflow passage 52 towards the branch line inlet 30, while also allowing for some working fluid to flow around the barrier 56 down the second outflow passage 54 to the bypass line 44.

Correspondingly, the second T-junction 48, which is associated with the branch line outlet 32, is defined by three ports or passages: a first inflow passage 58 from the branch line 28 defining the branch line outlet 32; a second inflow passage 60 from the bypass line 44; and an outflow passage 62 to the tank 20 defining the fluid circuit outlet 42 of the flow diverter 38a. The second T-junction 48 comprises a diverting barrier 64 at the intersection of the two inflow passages 58 and 60, which extends partway across the second inflow passage 60 from the bypass line 44. In this way, the diverting barrier 64 of the second T-junction 48 allows for fluid from the two inflow passages 58 and 60 to converge, while obstructing backflow along the bypass line 44 towards the branch line inlet 30. A one-way valve may additionally or alternatively be provided in the second inflow passage 60 to further mitigate backflow along the bypass line 44.

Also shown in FIG. 3 is a one-way valve 66 in the branch line 28 downstream of the branch line pump 36. The one-way valve 66 is a normally-closed valve that is arranged to open at a relatively low pressure, and so is arranged to prevent idle flow through the branch line 28 when the branch line pump 36 is inactive (i.e. when the cooling system is in the 'warming mode'), but opens to allow flow through the branch line 28 once the branch line pump 36 generates pressure in the branch line 28.

Figure 4A:
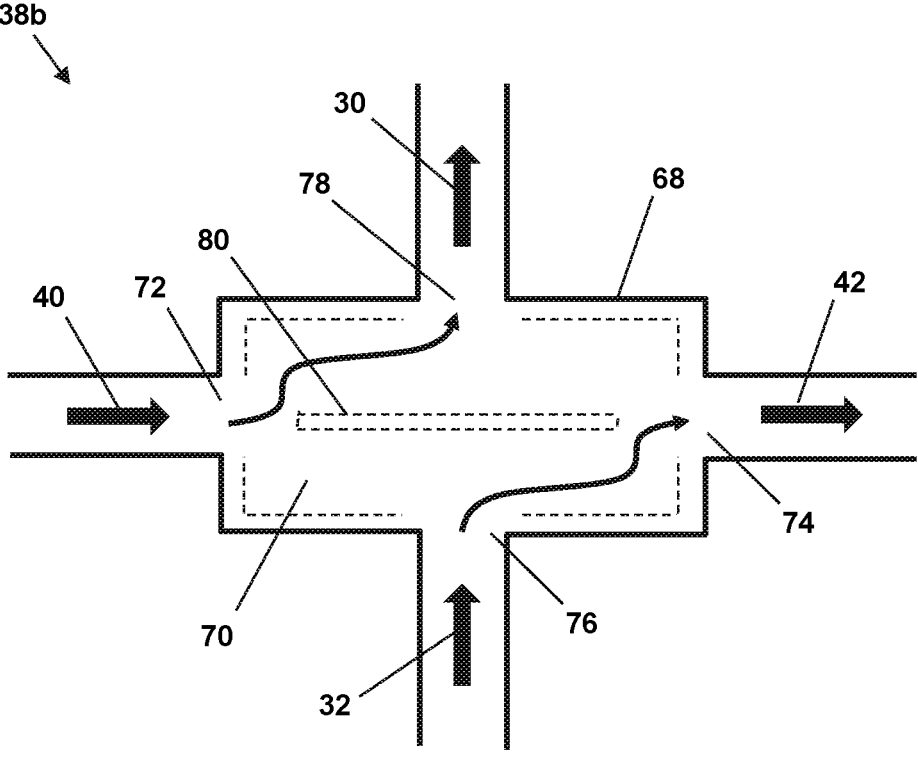
FIGS. 4a to 4c are schematic views of a flow diverter according to an embodiment of the invention for use in the cooling system of FIG. 2, showing the diverter in different operating modes.
Figure 4B:
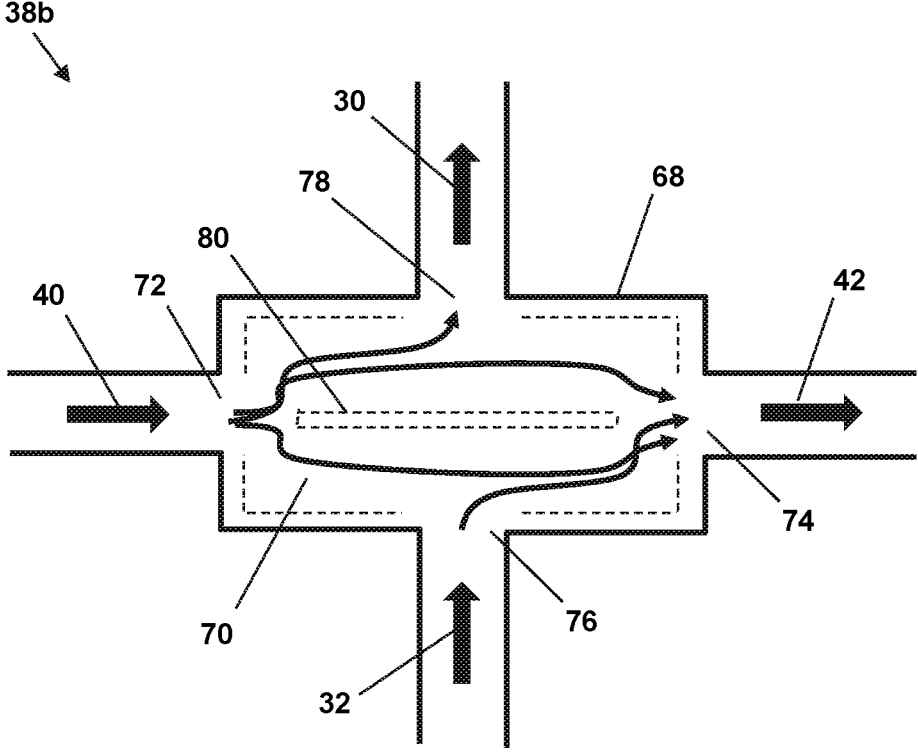
Figure 4C:
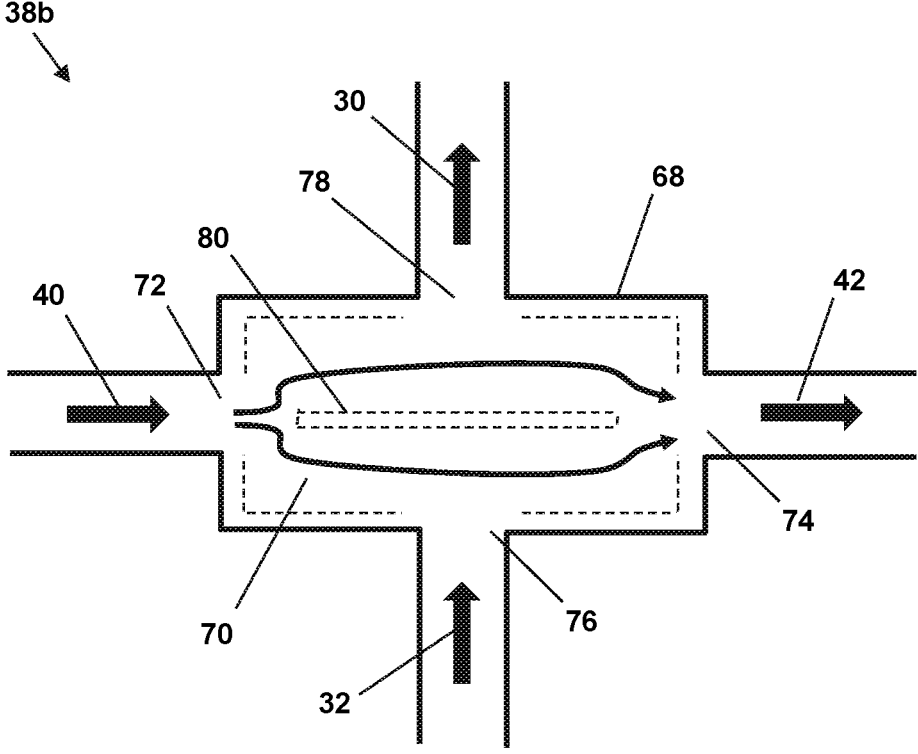

FIGS. 4a to 4c show another embodiment of a flow diverter 38b for the cooling system 12 of FIG. 2. The flow diverter 38b comprises a cuboidal housing 68 that encloses a hollow interior defining a diverter chamber 70. It is noted that various other shapes may be used for the housing 68 in embodiments of the invention.

The housing 68 comprises four circular openings that define respective ports 72, 74, 76, 78 that each communicates with the diverter chamber 70, each port being located centrally on a respective planar wall of the housing. A first of these ports 72, shown to the left in FIG. 4a, defines the fluid circuit inlet 40, and correspondingly an oppositely-positioned port 74, shown to the right in FIG. 4a, defines the fluid circuit outlet 42. Accordingly, the fluid circuit inlet 40 is aligned and coaxial with the fluid circuit outlet 42 in this embodiment.

A further port 76, shown at the bottom of the housing in FIG. 4a, defines the branch line outlet 32, while the final port 78, which is shown at the top of the housing in FIG. 4a, defines the branch line inlet 30. Accordingly, in this embodiment the branch line inlet 30 is aligned and coaxial with the branch line outlet 32 along an axis that is transverse to a common axis of the fluid circuit inlet 40 and the fluid circuit outlet 42.

Accordingly, the flow diverter 38b defines a pair of orthogonal axes of symmetry: one that coincides with the respective central axes of the fluid circuit inlet 40 and the fluid circuit outlet 42, and a second that coincides with the respective central axes of the branch line inlet 32 and the branch line outlet 34. This symmetry minimises pressure losses within the flow diverter 38b.

The symmetry of the flow diverter 38b also creates a passive flow directing effect, in that the branch line inlet 30 and the branch line outlet 32 are at positions of substantially equal fluid pressure in the flow diverter 38b as they are equidistant from both the fluid circuit inlet 40 and the fluid circuit outlet 42, meaning that there is no pressure differential to urge fluid into the branch line 28 unless the branch line pump 36 is active.

The flow diverter 38b also comprises a diverting barrier 80 positioned within the housing 68 and configured to obstruct flow between the branch line outlet 32 and the branch line inlet 30. In this embodiment, the diverting barrier 80 is defined by an elongate planar wall that extends centrally within the housing 68 along the axis of symmetry that intersects the fluid circuit inlet 40 and the fluid circuit outlet 42. Accordingly, the barrier 80 is substantially parallel to a direction of flow of working fluid through the fluid circuit 16 and substantially orthogonal to a direction of flow of working fluid discharged from the branch line outlet 32. In this way, the flow diverter 38b substantially prevents the working fluid from backflowing from the branch line outlet 32 to the branch line inlet 30.

Meanwhile, the barrier 80 is thin in the manner of a blade, such that it presents minimal obstruction to fluid flowing directly from the fluid circuit inlet 40 to the fluid circuit outlet 42, and thus minimises pressure losses for working fluid in the fluid circuit 16. This in turn reduces demands placed on the main pump 26.

As shown in FIGS. 4a to 4c, the flow diverter 38b cooperates with the branch line pump 36 to control the flow of working fluid into, around, and out of the branch line 28.

When the branch line pump 36 is activated to initiate the cooling mode, working fluid is drawn through the fluid circuit inlet 40 of the flow diverter 38b and then through the branch line inlet 30 to enter the branch line 28. FIG. 4a shows a scenario in which the branch line pump 36 output is maximised so that substantially all of the working fluid entering the fluid circuit inlet 40 is drawn into the branch line 28, and no fluid flows directly to the fluid circuit outlet 42 from the fluid circuit inlet 40. The fluid is subsequently pumped around the branch line 28 by the branch line pump 36, and re-enters the flow diverter 38b via the branch line outlet 32. The combined effect of the obstruction presented by the diverting barrier 80 and the pressure generated by the main pump 26 then directs the fluid to the fluid circuit outlet 42, where the fluid is returned to the fluid circuit 16.

In the scenario shown in FIG. 4b, the branch line pump 36 is operated to produce a lower output such that only a portion of the working fluid entering the fluid circuit inlet 40 is drawn into the branch line 28. Accordingly, the flow of the working fluid is split as shown in FIG. 4b, so that some of the working fluid flow is diverted around the branch line 28 while the remaining fluid flows through the flow diverter 38b directly to the fluid circuit outlet 42, thereby bypassing the branch line 28.

When the branch line pump 36 is idle so that the system 12 acts in the warming mode, the one-way valve 66 closes and no fluid flows through the branch line 28. Accordingly, all of the working fluid flows directly through the flow diverter 38b from the fluid circuit inlet 40 to the fluid circuit outlet 42 under the action of the main pump 26, thereby bypassing the branch line 28, as shown in FIG. 4c. The flow diverter 38 creates a minimal pressure loss in this situation, as there are no constrictions to the flow and the working fluid does not change direction significantly.

Figure 5:
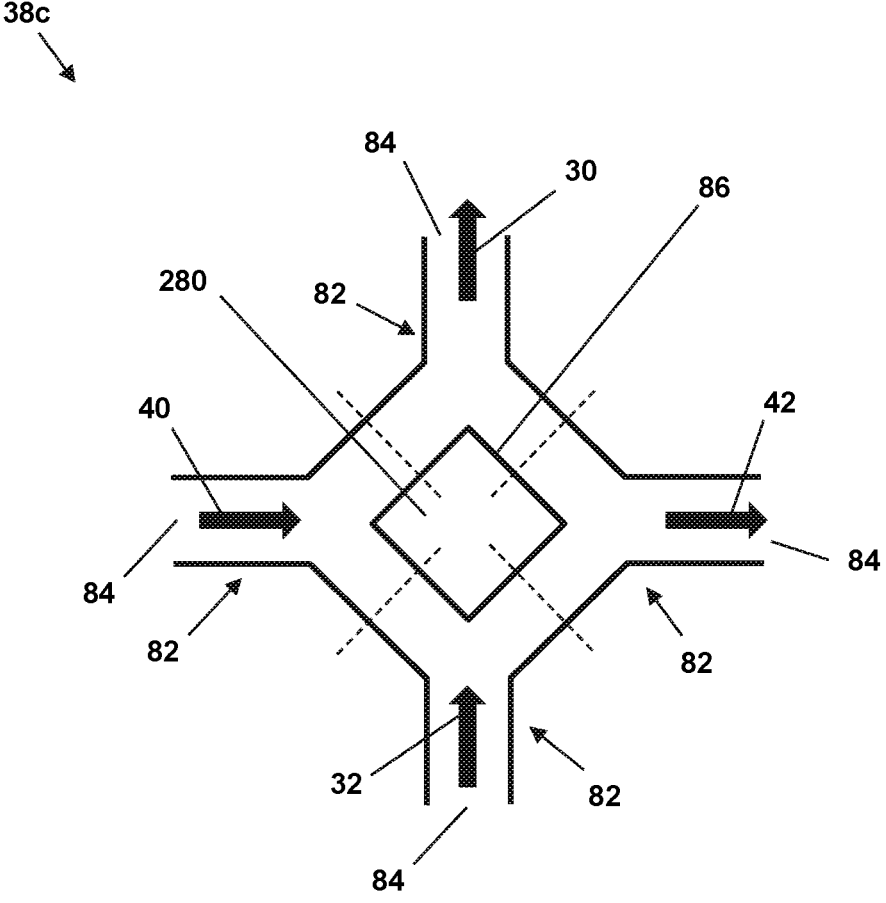
FIG. 5 is a schematic view of a flow diverter according to another embodiment of the invention for use in the cooling system of FIG. 2.

FIG. 5 shows another embodiment of the flow diverter 38c that can be used in the cooling system of FIG. 2. In this case, the flow diverter 38c comprises an arrangement of four identical Y-junctions 82 connected together to form a square configuration with four degrees of rotational symmetry and four corresponding axes of symmetry. The junctions 82 are connected so that each has an outwardly projecting port 84 at a respective corner of the square configuration. These four ports 84 respectively define the fluid circuit inlet 40, the fluid circuit outlet 42, the branch line inlet 30, and the branch line outlet 32.

The conduits collectively form an inner boundary wall 86 that is square in plan view and encloses a square central void. The boundary wall 86 defines a diverting barrier 280 between the branch line inlet 32 and the branch line outlet 30 which obstructs flow from the branch line outlet 30 and the branch line inlet 32, in a similar manner to the barrier 80 of the flow diverter 38 of FIGS. 4a to 4c as described above.

In this respect, the square configuration of the conduits forces a change in direction of flow of the working fluid entering through any of the ports 84. In particular, working fluid entering through the branch line outlet 30 cannot flow directly towards the branch line inlet 32, but must turn to follow the path defined by the conduits. Fluid exiting the branch line outlet 30 will merge with fluid flowing from the fluid circuit inlet 40, and will thus be carried towards the fluid circuit outlet 42. The fluid will then naturally flow out through the fluid circuit outlet 42, as a far greater change in flow direction would be required to flow on from there to the branch line inlet 32.

Moreover, as for the embodiment of FIGS. 4*a* to 4*c*, the symmetry of the flow diverter 38*c* of FIG. 5 creates a balanced arrangement in which the branch line inlet 32 and the branch line outlet 30 are at positions of substantially equal pressure when the branch line pump 36 is inactive, which ensures that there is no backflow of working fluid from the branch line outlet 30 to the branch line inlet 32.

The cooling system 12 may be configured to cool more than one component 14 within the nacelle 4, and FIG. 6 shows one possible way in which the system 12 may be configured to achieve this. Specifically, FIG. 6 shows a cooling system 12 arranged to cool two components 14, namely a generator 14 and a power converter 14'. The cooling system 12 here includes a respective branch line 28, 28', branch line pump 36, 36', and flow diverter 38, 38' associated with each component 14, 14'. It will therefore be appreciated that, although two components with respective branch lines are shown in FIG. 6, the cooling system 12 may be similarly extended to any number of components in the nacelle 4 requiring thermal control by adding further branch lines and associated components.

In this example, the generator 14 and the power converter 14' are arranged in the fluid circuit 16 in series, so that fluid output from (or via) the generator 14 is input into (or via) the power converter 14'.

A respective branch line 28, 28' (including a branch line pump 36, 36' and a cooling device 34, 34') and an associated flow diverter 38, 38' is arranged in the fluid circuit 16 directly after each component 14, 14'. That is to say, the cooling system 12 comprises a first branch line 28 and associated flow diverter 38 arranged between the generator 14 and the power converter 14', and a second branch line 28' and associated flow diverter 38' arranged between the power converter 14' and the tank 20. In this way, the temperature of each component 14, 14' can be independently regulated in a localised manner by controlling the branch line pump 36, 36' in each respective branch line 28, 28'. For example, the warming mode may be activated for the generator 14 to allow its temperature to rise, while the cooling mode is applied to the power converter 14' simultaneously.

Since the additional pumping requirements of each additional branch line 28 are met by the associated additional branch line pump 36, the requirements of the main pump 26 remain substantially the same, regardless of how many components 14 and associated branch lines 28 are incorporated. Consequently, the cooling system architecture is modular and scalable in the sense that any number of components 14 and associated branch lines 28 can be incorporated into the system 12 without adjusting the specification of the main fluid circuit 16. As such, the cooling system 12 can be easily scaled to integrate into wind turbine generators 2 of different sizes and requirements.

In the embodiment shown in FIG. 6, each branch line 28, 28' is fluidly connected to a respective cooling device 34, 34'. However, in other variants multiple branch lines 28 may connect to the same cooling device 34 instead.

The skilled person will appreciate that modifications may be made to the specific embodiments described above without departing from the inventive concept as defined by the claims.

For example, instead of the one-way valve shown in FIG. 2 for closing the branch line when the branch line pump is inactive, a thermal valve or an electronically-controlled valve may be used to similar effect. Moreover, in some embodiments no valve is required in the branch line, for example because the flow diverter is capable of substantially preventing idle flow through the branch line when the branch pump is inactive.

Instead of a single branch line pump for each branch line as in the embodiments shown in FIGS. 2 and 6, in other variants each branch line includes multiple branch line pumps to provide the required flexibility of output. Such pumps would typically be arranged in series in the branch line, although parallel topologies are also possible. In other variants, flow restrictors are used in combination with the or each branch line pump to provide the required variable output.

The invention claimed is:

1. A cooling system for a wind turbine, the cooling system comprising:
   a fluid circuit arranged to convey a working fluid to and from at least one component of the wind turbine to exchange heat between the working fluid and the at least one component;
   a main pump configured to circulate the working fluid around the fluid circuit; and
   at least one branch line connected to the fluid circuit, said at least one branch line comprising:
      an inlet arranged to receive working fluid from the fluid circuit;
      an outlet arranged to return working fluid to the fluid circuit;
      a branch pump arranged to pump working fluid through the at least one branch line from the inlet to the outlet; and
      a cooling device arranged to cool working fluid flowing through the at least one branch line,
   wherein an entirety of the working fluid in the at least one branch line is received from the fluid circuit.

2. The cooling system of claim 1, wherein the branch pump is operable to produce a variable output.

3. The cooling system of claim 2, wherein the branch pump comprises any of: a variable-frequency drive; a variable-voltage drive; and a variable-speed drive.

4. The cooling system of claim 1, wherein the at least one branch line comprises a valve configured to prevent fluid flow through the at least one branch line when the branch pump is inactive.

5. The cooling system of claim 4, wherein the valve is configured as a normally-closed valve.

6. The cooling system of claim 1, comprising a flow director that comprises a main inlet configured to receive working fluid from the fluid circuit, a main outlet configured to discharge working fluid into the fluid circuit, and a port connected to the outlet of the at least one branch line.

7. The cooling system of claim 6, wherein the flow director is configured to direct working fluid discharged from the outlet of the at least one branch line away from the inlet of the at least one branch line.

8. The cooling system of claim 6, wherein the flow director comprises a further port that is connected to the inlet of the at least one branch line.

9. The cooling system of claim 8, wherein the port and the further port of the flow director are at positions in the flow director that are at equal pressure when the branch pump is inactive.

10. The cooling system of claim 8, wherein the further port is disposed between the main inlet and the main outlet of the flow director.

11. The cooling system of claim 6, wherein the flow director comprises at least one axis of symmetry.

12. The cooling system of claim 6, wherein the flow director comprises a barrier that is configured to obstruct working fluid flowing from the outlet of the at least one branch line to the inlet of the at least one branch line.

13. The cooling system of claim 12, wherein the barrier is parallel to a direction of flow of working fluid through the fluid circuit.

14. The cooling system of claim 12, wherein the barrier is orthogonal to a direction of flow of working fluid discharged through the outlet of the at least one branch line.

15. The cooling system of claim 12, wherein the barrier extends between the inlet and the outlet of the at least one branch line.

16. The cooling system of claim 6, wherein the port is disposed between the main inlet and the main outlet of the flow director.

17. A wind turbine comprising the cooling system of claim 1.

18. A method of cooling one or more components of a wind turbine with the cooling system of claim 1, the method comprising:

operating the main pump to convey the working fluid around the fluid circuit to and from each component of the wind turbine, to exchange heat between the working fluid and each component; and operating the branch pump to draw at least a portion of the working fluid into the at least one branch line that is connected to the fluid circuit and that comprises the cooling device arranged to cool the working fluid flowing through the at least one branch line.

19. A cooling system for a wind turbine, the cooling system comprising:

a fluid circuit arranged to convey a working fluid to and from at least one component of the wind turbine to exchange heat between the working fluid and the at least one component;

a main pump configured to circulate the working fluid around the fluid circuit; and at least one branch line connected to the fluid circuit, said at least one branch line comprising:

an inlet arranged to receive working fluid from the fluid circuit;

an outlet arranged to return working fluid to the fluid circuit;

a branch pump arranged to pump working fluid through the at least one branch line from the inlet to the outlet; and a cooling device arranged to cool working fluid flowing through the at least one branch line, wherein the at least one branch line is devoid of a wind turbine component, spaced from the branch pump, that heats the working fluid flowing through the at least one branch line.

20. A cooling system for a wind turbine, the cooling system comprising:

a fluid circuit arranged to convey a working fluid to and from at least one component of the wind turbine to exchange heat between the working fluid and the at least one component;

a main pump configured to circulate the working fluid around the fluid circuit; and at least one branch line connected to the fluid circuit, said at least one branch line comprising:

an inlet arranged to receive working fluid from the fluid circuit;

an outlet arranged to return working fluid to the fluid circuit;

a branch pump arranged to pump working fluid through the at least one branch line from the inlet to the outlet; and a cooling device arranged to cool working fluid flowing through the at least one branch line, wherein an entirety of the working fluid in the at least one branch line flows through the cooling device in the at least one branch line before being returned to the fluid circuit.

* * * * *